(No Model.)
E. WESTON.
ELECTRICAL MEASURING INSTRUMENT.
No. 473,539. Patented Apr. 26, 1892.
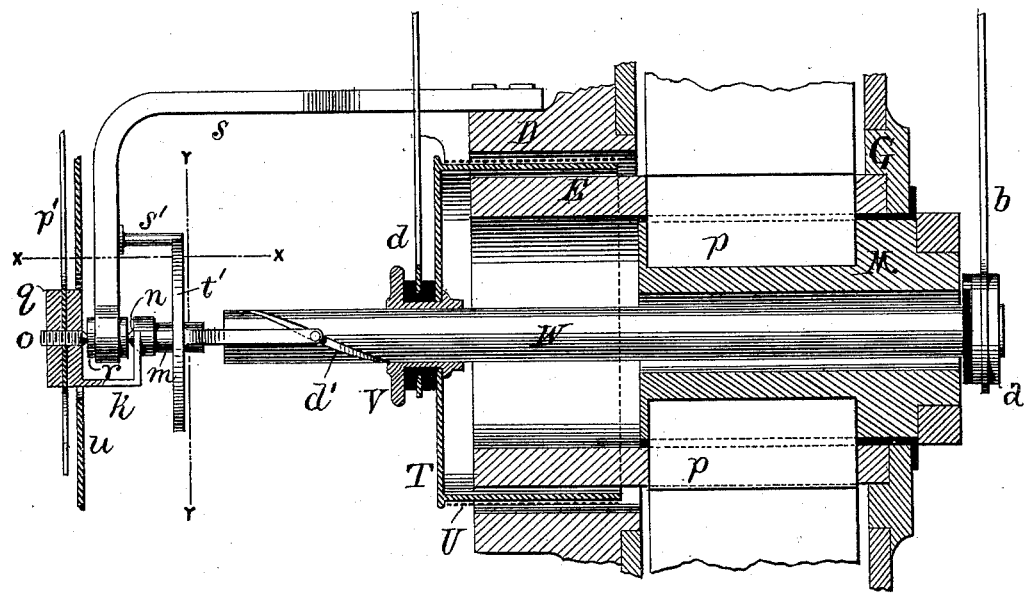
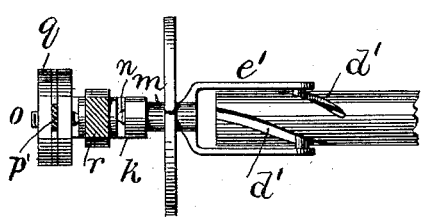
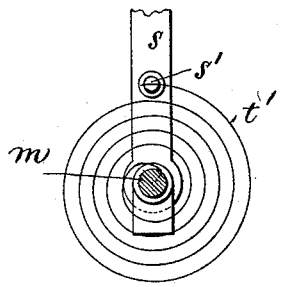
WITNESSES:
Gustave Dieterich
C. Aug. Dieterich
INVENTOR
Edward Weston
BY Park Benjamin
his ATTORNEY.

UNITED STATES PATENT OFFICE.

EDWARD WESTON, OF NEWARK, NEW JERSEY.

ELECTRICAL MEASURING INSTRUMENT.

SPECIFICATION forming part of Letters Patent No. 473,539, dated April 26, 1892.

Application filed January 24, 1891. Serial No. 378,894. (No model.)

*To all whom it may concern:*

Be it known that I, EDWARD WESTON, of Newark, Essex county, New Jersey, have invented a new and useful Improvement in Electrical Measuring Instruments, of which the following is a specification.

My invention is a device intended for use in electrical measuring instruments, and serving to convert the rectilinear movement of an armature or other movable body actuated by the current to be measured to assume a certain position into rotary movement of the needle over a scale.

My invention consists in mechanism for the above purpose, as hereinafter more particularly described.

In the accompanying drawings, Figure 1 is a partial vertical section of an electrical measuring-instrument of a form already patented to me to which my present invention is shown applied. Fig. 2 is a horizontal section on the line X X of Fig. 1, and Fig. 3 is a vertical section on the line Y Y of Fig. 1.

Similar letters of reference indicate like parts.

G represents the body or main portion of a drum-shaped magnet, of which D and E are the pole-pieces. Within the pole-piece E is disposed a hollow core M, to which are secured the terminals $p$ of flat strips of metal, which are wound around the core and form a coil through which the current to be measured passes. Extending through the core M is a metal tube W, one extremity of which is supported by a cap or collar $a$. Said tube also passes through a sleeve V. Secured, respectively, to the collar $a$ and sleeve V are leaf-springs $b$ $d$, which support the tube W in position. Carried upon the sleeve V is the flanged disk or hollow cylinder T, upon which is wound a coil U of fine insulated wire U. The coil U may be electrically connected with the coil $p$, and, as shown, said coil U is disposed in the intense annular field of force existing between pole-pieces D and E. When the coils U and P are traversed by a current to be measured, the coil U is moved more or less into said annular field, and the extent of its movement will be dependent upon the difference of potential existing between the terminals of the instrument, so that by indicating the movement of said coil upon a suitable scale laid off in proper units said difference of potential or current pressure or strength may be measured.

I do not claim herein the aforesaid construction, inasmuch as the same has already been patented to me in Letters Patent No. 446,493, dated February 17, 1891.

Secured to the pole-piece D or any other suitable fixed support is an arm $s$. Upon the extremity of the tube W and beyond the sleeve V are cut two spiral grooves $d'$ of quick pitch. Said grooves receive, respectively, pins, which project inwardly from the inner sides of the fork $e'$, as best shown in Fig. 2. The fork $e'$ is formed upon a rod $m$, secured to one arm of the yoke $k$. Extending through the opposite arm of the yoke $k$ is a threaded pin $o$. The needle $p'$ of the instrument is secured between said arm and a washer $q$ by said pin $o$. The inner end of the pin $o$ is pointed to form a pivot, and a similar pivot $n$ is formed on the opposite yoke-arm. Between the pivot-pins $n$ and $o$ is a cylindrical block $r$, which is received in the end of the fixed arm $s$. The stirrup $k$ extends through an opening in the scale-plate $u$, over which the needle $p'$ moves. Upon the arm $s$ is a pin $s'$, to which is secured one end of a spiral spring $t'$. The other end of said spring is fastened to the rod $m$.

The operation of the mechanism just described is as follows: When the coil U moves into or out of the annular space between the pole-pieces D E, the tube W is of course caused also to move in the direction of its longitudinal axis. The pins upon the fork $e'$ are thus compelled to traverse the quick-pitch spiral grooves $d'$, and consequently said fork, and hence the rod $m$ and yoke $k$, is compelled to turn on the pivot-pins $n$ $o$, and by reason of this rotation the needle $p'$ is moved over the scale $u$. Obviously the extent of rotation of the support, and hence the extent of movement of the needle, will correspond to the extent of axial movement of the tube W and coil U. Hence the axial movement of the coil U is converted into rotary movement of the needle $p'$ over the scale. The spiral spring $t'$ is wound in such direction as to oppose by its elasticity the rotation of the parts when the coil U is drawn into the annular space between the pole-pieces. When the current is arrested, the effect of the spring is to assist in bringing the needle $p'$ back to its normal or zero position.

I do not limit myself to the combination of the transmitting mechanism herein set forth with an instrument necessarily embodying a coil movable in a field of force, because, obviously, it may be used, for example, in any device in which an armature is moved in said field to convert the rectilinear movement of said armature into rotary motion of an index.

I claim—

1. In an electrical measuring instrument, a magnet having concentric annular poles, a coil in the annular interpolar space, a support for said coil axially movable within said magnet and having on its periphery a spiral guide, an independently-supported rotary shaft engaging with said guide, an index carried by said shaft, and a scale over which the said index-needle moves.

2. In an electrical measuring instrument, a magnet having concentric annular poles, a coil in the annular interpolar space, a support for said coil axially movable within said magnet and having on its periphery a spiral guide, an independently-supported rotary shaft engaging with said guide, a spring engaging with said shaft and with a fixed abutment and tending to rotate said shaft in a direction opposite to its impressed movement by said guide, an index-needle carried by said shaft, and a scale over which said index-needle moves.

EDWARD WESTON.

Witnesses:
K. W. ELY,
R. C. FESSENDEN.